Dec. 28, 1948.   L. EISELE   2,457,455
CLINICAL THERMOMETER
Filed May 4, 1944
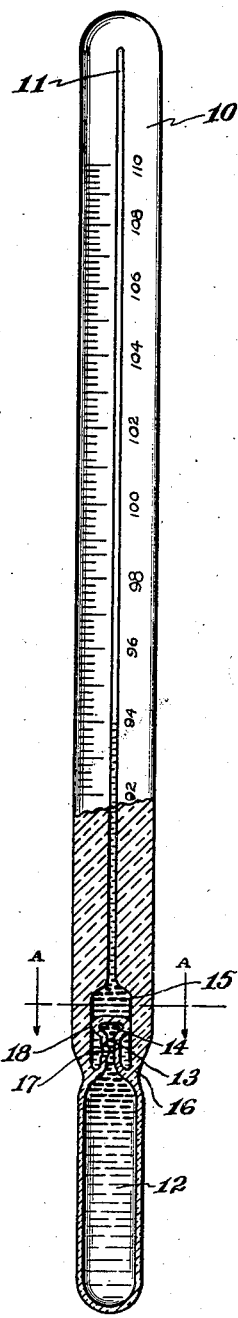
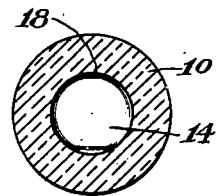
Fig. 2.
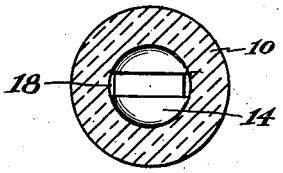
Fig. 3.
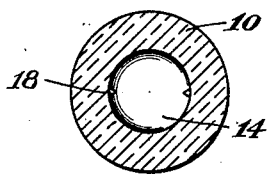
Fig. 4.
LOGAN EISELE
INVENTOR
BY *Robert J. Killman*
ATTORNEY Patented Dec. 28, 1948

2,457,455

UNITED STATES PATENT OFFICE 2,457,455

CLINICAL THERMOMETER

Logan Eisele, Nashville, Tenn.

Application May 4, 1944, Serial No. 534,064

2 Claims. (Cl. 73—371)

This invention relates to clinical or self-registering thermometers. This type thermometer may be defined as one which, upon being inserted in the oral or rectal cavity or other place the temperature of which it is desired to ascertain, the mercury column will rise to the proper point to indicate the temperature upon a suitable scale, usually engraved upon the thermometer stem, but, upon being removed from said cavity, the mercury column will maintain its position in the stem, thus allowing the reading to be made at any time subsequent to such removal, due to the fact that this type of thermometer includes a device which causes mercury column to separate into two parts at some point between the bulb and the scale, the lower part of the column receding into the bulb as the temperature of the thermometer falls to the ambient temperature, while leaving the upper portion of the mercury column in the highest position it reached during the time the thermometer was inserted in the cavity.

The device by which the mercury column is caused to divide or separate as the temperature of the bulb falls usually is called the contraction and usually consists of a small, partially collapsed bulb formed in the thermometer bore between the main bulb and the scale portion of the stem. The two opposite walls of said contraction bulb are collapsed against each other forming a bifurcated passage of reduced cross section as compared to the bore of the thermometer stem.

The contraction so formed constitutes such an obstruction to the movement of the mercury column that the cohesive force of the mercury is unable to pull the upper portion of the mercury column therethrough, thus causing the column to divide at the contraction.

The proper forming of this contraction requires great skill in manipulation, and even under optimum conditions a large percentage of rejects are inevitable.

It is an object of this invention to disclose a new and novel form of contraction which will serve all the useful purposes of the usual form of contraction, but which may be made by relatively unskilled operators and which will eliminate several operations necessary to make the prior form of contraction and which will result in a much smaller percentage of rejects.

The construction of my new form of clinical or self-registering thermometer contraction may best be understood by referring to the accompanying drawings in which:

Figure 1 is a partial longitudinal section of the thermometer of my invention.

Figures 2, 3, and 4 are cross sections taken along the line A—A of Figure 1, showing various optional forms the leakage openings, hereinafter described, may take.

Referring now in more detail to the drawings the numeral 10 denotes the stem of glass containing the axially positioned capillary or bore 11. A suitable scale is engraved upon the surface of the stem 10 and shows, by the height of the top of the mercury column in bore 11, the temperature to which the bulb 12 of the thermometer is or has been subjected.

The bulb 12 is formed from a separate piece of glass from the stem 10 and at one end is formed into a neck 13 which carries at its distal end an enlargement, bulb or knob 14. The lower end of the stem 10 is interiorly enlarged to form the cavity 15 open at its lower end. The stem 13 and enlargement 14 of bulb 12 are inserted into cavity 15 and the bulb 12 is welded or fused to the lower end of the stem by means of the circumferential weld 16. An aperture 17 is formed in the wall of stem 13. The bulb 12 is filled with mercury, the remaining space is evacuated in the usual manner and the upper end of the stem is sealed off. The circumference of enlargement 14 is not a perfect fit in the interior of cavity 15, being of oval shape as shown in Figure 2 or having grooves formed therein as shown in Figures 3 and 4 or otherwise formed so that there remain small spaces 18 between the circumference of enlargement 14 and the inner surface of cavity 15 and these small spaces constitute the contraction or restriction to the flow of mercury which causes the mercury column to divide.

The operation of my new improved thermometer is as follows: Upon being subjected to an elevated temperature the mercury contained in bulb 12 expands and travels outward through aperture 17 and forces past the restrictions 18 between the enlargement 14 and the inner surface of cavity 15 into bore 11 thus indication by the position of the top of the column the temperature to which the bulb has been subjected. Upon being removed from the source of heat the mercury contained in bulb 12 contracts and the column divides in spaces 18, the lower part receding into the bulb and the upper part remaining in its indicating position.

After the reading has been taken the upper portion of the mercury column may be caused to rejoin that in the bulb by shaking it down in the usual manner.

It will be obvious that certain departure may be made from the details of construction shown without departing from the spirit of my invention. For example, stem 13 and enlargement 14 may be solid instead of hollow as shown; the aperture 17 may be positioned at any point between spaces 18 and weld 16 and may consist of a plurality of apertures of any suitable size and shape. Numerous other variations all within the scope of my invention will be obvious to those skilled in the art.

Having thus described my invention, what I claim as new is:

1. A clinical or self-registering thermometer comprising a stem portion having a small bore therethrough, a mercury containing bulb joined to said stem, said stem having a cavity in its lower end communicating with said bulb and said bore, said bulb being formed at one end with a perforated neck member which carries at its distal end an enlargement which extends into said cavity, the outer surface of said enlargement and the inner surface of said cavity defining therebetween small leakage openings of such size that the forces of gravity and cohesion are unable to cause mercury to pass therethrough but at the same time large enough that a reasonable amount of shaking or slinging will cause mercury to pass therethrough, said bulb and said bore being partially filled with mercury and evacuated.

2. A clinical thermometer comprising a stem having a bore therethrough, a bulb joined to said stem, said stem having a cavity in its lower end between said bulb and said bore and communicating with said bulb and bore, said bulb being formed at one end with a neck member extending into said cavity and defining between its outer surface and the inner surface of the cavity small leakage passages.

LOGAN EISELE.

REFERENCES CITED

The following references are of record in the file of this patent:

UNITED STATES PATENTS

| Number | Name | Date |
|---|---|---|
| 613,190 | Cossor | Oct. 25, 1898 |
| 1,199,121 | Siebert | Sept. 26, 1916 |

FOREIGN PATENTS

| Number | Country | Date |
|---|---|---|
| 165,837 | Germany | Dec. 1, 1905 |
| 281,878 | Germany | Feb. 4, 1915 |